D. M. LAMB.
Apparatus for Purifying and Filtering Oils.
No. 144,621. Patented Nov. 18, 1873.
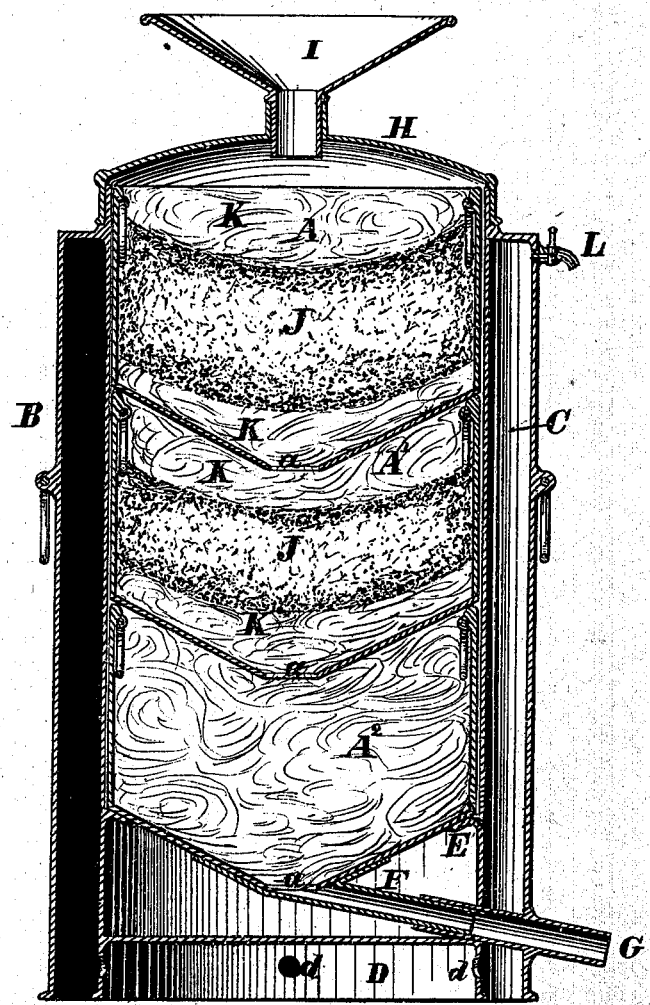
WITNESSES:
INVENTOR:
Daniel Martin Lamb
By Knight Bros. Attorneys.

UNITED STATES PATENT OFFICE.

DANIEL M. LAMB, OF STRATHROY, CANADA.

IMPROVEMENT IN APPARATUS FOR PURIFYING AND FILTERING OILS.

Specification forming part of Letters Patent No. 144,621, dated November 18, 1873; application filed November 10, 1873.

*To all whom it may concern:*

Be it known that I, DANIEL MARTIN LAMB, of Strathroy, in the county of Middlesex and Province of Ontario, Canada, have invented a new and useful Improvement in Filters for Oil and other liquids, of which the following is a specification:

My improved filter consists of a series of pans containing the filtering material, and resting one on another within a casing constructed with the customary heating-jacket.

These pans have conical or funnel-shaped bottoms leading down to a central aperture in each, so that the liquid is introduced and discharged at the center of each pan. Any number of sets or series of these pans may be applied successively to a single casing. The filtering material preferably consists of charcoal with a body of cotton above and below, as hereinafter described.

The accompanying drawing is a vertical section of a filter, illustrating my invention.

A $A^1$ $A^2$ represent a series of pans, set one on another within a casing, B, which is constructed with double walls, forming between them an annular space or jacket, C. The bottom of the casing is formed with a chamber, D, communicating, through apertures $d$ $d$, with the jacket C. A cock, L, may be employed to let air out of the jacket, so as to enable steam to fill it. The lowest pan, $A^2$, rests at its periphery on a flange, E, and at its center in a funnel-shaped conductor, F, which leads the filtered liquid into a discharge-pipe, G. $a$ $a$ $a$ are central discharge-apertures in the funnel-shaped bottoms of the pans. H represents the cap of the shell or casing, having an aperture at its center to receive a funnel, I, or a stopper, by which the apparatus may be closed while in operation. J J represent bodies of charcoal for filtering and purifying the liquid. Any preferred description of charcoal may be used. I, however, prefer to employ for this purpose the fibrous residuum of dried milkweed, from which the gummy matter has been removed by solution, as described in my application for Letters Patent for an improvement in the manufacture of vulcanizable gum, the said fibrous matter being charred in suitable closed vessels over a moderate fire, or the dried stalks are charred for the purpose before being treated for the extraction of the gum. K K represent bodies of cotton placed above and below the charcoal in the pans A $A^1$, and filling the pan $A^2$.

In operation, the base of the casing may be set upon a board or table, over the mouth of a steam or hot-air pipe. The bottom pan $A^2$ may be completely filled with cotton. In the other pans I place a layer of cotton—say, six inches thick—then an equal or greater thickness of charcoal, and then another layer of cotton.

The liquid to be filtered is poured in through the funnel I on the center of the filling of the upper pan, A. It then percolates through the cotton and coal, and is discharged through the aperture $a$ in the center of the funnel-shaped bottom, and received on the center of the filling of the next pan below, and so on.

The location of both the inlet and the outlet at the center prevents the liquid running down on the outside and escaping the filtering material, and to this end the liquid is introduced gradually from a reservoir no faster than it will filter through.

My improved filter is of great value for purifying petroleum and all the products thereof. It produces a pure lubricating-oil from crude petroleum.

The following is claimed as new:

The series of two or more movable pans, A $A^1$, with conical bottoms, containing a filling of cotton and charcoal, and resting one on another within a jacketed casing, B, all as herein shown and described, for the purposes set forth.

D. M. LAMB.

Witnesses:
EDM. F. BROWN,
OCTAVIUS KNIGHT.